United States Patent
McCarty et al.

(10) Patent No.: US 11,487,504 B2
(45) Date of Patent: Nov. 1, 2022

(54) GENERATING QUANTUM REPRESENTATIONS OF HEXADECIMAL DATA

(71) Applicant: Accenture Global Solutions Limited, Dublin (IE)

(72) Inventors: Benjamin Glen McCarty, Washington, DC (US); Ellie Marie Daw, Washington, DC (US)

(73) Assignee: Accenture Global Solutions Limited, Dublin (IE)

( * ) Notice: Subject to any disclaimer, the term of this patent is extended or adjusted under 35 U.S.C. 154(b) by 658 days.

(21) Appl. No.: 16/599,598

(22) Filed: Oct. 11, 2019

(65) Prior Publication Data

US 2021/0109707 A1 Apr. 15, 2021

(51) Int. Cl.
*G06N 10/00* (2022.01)
*G06F 5/00* (2006.01)
*H04L 9/32* (2006.01)

(52) U.S. Cl.
CPC ............ *G06F 5/00* (2013.01); *G06N 10/00* (2019.01); *H04L 9/3234* (2013.01); *H04L 9/3236* (2013.01); *G06F 2205/003* (2013.01)

(58) Field of Classification Search
CPC .................................. G06N 10/00; G06F 5/00
USPC ......................................................... 706/62
See application file for complete search history.

(56) References Cited

U.S. PATENT DOCUMENTS

| 7,028,275 | B1 | 4/2006 | Chen et al. |
| 7,035,411 | B2 | 4/2006 | Azuma et al. |
| 8,631,367 | B2 | 1/2014 | Pesetski et al. |
| 2020/0272928 | A1 | 8/2020 | Van den Berg |
| 2021/0058244 | A1* | 2/2021 | Jacak .................. H04L 9/0852 |
| 2021/0111898 | A1 | 4/2021 | McCarty et al. |

OTHER PUBLICATIONS

A quantum encryption design featuring confusion, diffusion, and mode of operation, Hu et al., Oct. 2020 (Year: 2020).
[No Author Listed], "Activity Guide—Encoding Hexadecimal Numbers", retrieved from URL: https://www.mrshasseld.com/uploads/2/6/1/1/26119949/u214activityguide_key-hexadecimalnumbers.pdf, retrieved on Dec. 11, 2019, 4 pages.
Barnum et al., "Authentication of Quantum Message" arXiv:quant-ph/0205128, dated May 20, 2002, 23 pages.

(Continued)

*Primary Examiner* — Tomi Skibinski
(74) *Attorney, Agent, or Firm* — Fish & Richardson P.C.

(57) ABSTRACT

Methods, systems, and apparatus for implementing a hexadecimal to quantum computation translation. In one aspect, a method includes obtaining one or more hexadecimal data inputs; applying a quantum computation translation operation to each hexadecimal data input to generate one or more corresponding sequences of quantum computations; implementing the one or more sequences of quantum computations using quantum computing hardware to obtain one or more corresponding sequence of measurement results; and providing the one or more sequences of measurement results as respective representations of the one or more hexadecimal data inputs.

20 Claims, 6 Drawing Sheets

(56) References Cited

OTHER PUBLICATIONS

Crockett et al., "Prototyping post-quantum and hybrid key exchange and authentication in TLS and SSH", retrieved from URL: https://csrc.nist.gov/CSRC/media/Events/Second-PQC-Standardization-Conference/documents/accepted-papers/stebila-prototyping-post-quantum.pdf, dated Jul. 19, 2019, 24 pages.

Kiktenko et al., "Lightweight authentication for quantum key distribution", arXiv:1903.10237v1, dated Mar. 25, 2019, 10 pages.

Ozols, "Clifford Group", retrieved from URL: http://home.lu.lv/~sd20008/papers/essays/Clifford%20group%20%5bpaper%5d.pdf, dated Jul. 31, 2008, 4 pages.

Soni et al., "Multi-factor Authentication Security Framework in Cloud Computing", International Journal of Advanced Research in Computer Science and Software Engineering, 5(1): 1065-1071, dated Jan. 1, 2015.

* cited by examiner

FIG. 4

Quantum computation translation operation of FIG. 3

Legend:
- T = Alice and Bob's entangled qubits will match 100% of the time
- F = Alice and Bob's entangled qubits will match 0% of the time
- % = Alice and Bob's entangled qubits will match 50% of the time
- ! = Unintended match of Alice and Bob's entangled qubits Alice rows: 0 I, 1 X, 2 H, 3 HX, 4 HS, 5 HS, 6 YH, 7 XH, 8 ZH, 9 SH, A S, B S, C XSH, D YSH, E ZSH, F SHX Bob columns: 0, 1, 2, 3, 4, 5, 6, 7, 8, 9, A, B, C, D, E, F

US 11,487,504 B2

GENERATING QUANTUM REPRESENTATIONS OF HEXADECIMAL DATA

CROSS REFERENCE TO RELATED APPLICATIONS

This application is related to U.S. patent application Ser. No. 16/599,576, titled "BIOMETRIC CHALLENGE-RESPONSE AUTHENTICATION", filed on Oct. 11, 2019 and to U.S. patent application Ser. No. 16/599,586, titled "AUTHENTICATION USING KEY DISTRIBUTION THROUGH SEGMENTED QUANTUM COMPUTING ENVIRONMENTS", filed on Oct. 11, 2019. The disclosure of each of the foregoing applications is incorporated herein by reference in its entirety.

BACKGROUND

The present invention relates to quantum computing.

Quantum computers uses quantum-mechanical phenomena such as superposition and entanglement to perform computations. One example model for quantum computation is the quantum circuit model. In the quantum circuit model, a computation is a sequence of quantum gates— reversible transformations on a quantum mechanical analog of an n-bit register. This analogous structure is referred to as an n-qubit register. Example quantum gates include single qubit gates such as the Hadamard gate or Pauli gates, and multi qubit gates such as the controlled NOT gate or SWAP gate.

SUMMARY

This specification describes systems, methods, devices and other techniques for implementing hexadecimal to quantum computation translation operations In general, one innovative aspect of the subject matter described in this specification can be implemented in a method that includes receiving one or more hexadecimal data inputs; applying a quantum computation translation operation to each hexadecimal data input to generate one or more corresponding sequences of quantum computations; implementing the one or more sequences of quantum computations using quantum computing hardware to obtain one or more corresponding sequence of measurement results; and providing the one or more sequences of measurement results as respective representations of the one or more hexadecimal data inputs.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the quantum computation translation operation maps each hexadecimal character to a respective quantum computation from a set of multiple quantum computations.

In some implementations each quantum computation in the set of multiple quantum computations comprises a sequence of at most three single-qubit quantum gates.

In some implementations the set of multiple quantum computations comprises five quantum computations comprising one respective single-qubit quantum gate.

In some implementations the set of multiple quantum computations comprises seven quantum computations comprising two respective single-qubit quantum gates.

In some implementations the set of multiple quantum computations comprises four quantum computations comprising three respective single-qubit quantum gates.

In some implementations one or more quantum computation in the set of quantum computation comprise one or more single-qubit quantum gates from the Clifford group.

In some implementations one or more quantum computation in the set of quantum computation comprises one or more single-qubit quantum gates from a universal set of gates.

In some implementations each quantum computation in the set of multiple quantum computations comprises one or more single-qubit quantum gates from a set of single-qubit quantum gates, the set of single qubit gates comprising identity operations, Pauli-X gates, Pauli-Y gates, Pauli-Z gates, Hadamard gates, S gates and complex conjugates of the S gate.

In some implementations the quantum computation translation operation maps: a first hexadecimal character to a single qubit identity operation; a second hexadecimal character to a Pauli-X gate, wherein the second hexadecimal character is different from the first hexadecimal character; a third hexadecimal character to a Hadamard gate, wherein the third hexadecimal character is different from the first and second hexadecimal character; a fourth hexadecimal character to a Hadamard gate and a Pauli-X gate, wherein the fourth hexadecimal character is different from the first-third hexadecimal character; a fifth hexadecimal character to a Hadamard gate and a S gate, wherein the fifth hexadecimal character is different from the first-fourth hexadecimal character; a sixth hexadecimal character to a Hadamard gate and a complex conjugate of an S gate, wherein the sixth hexadecimal character is different from the first-fifth hexadecimal character; a seventh hexadecimal character to a Pauli-Y gate and a Hadamard gate, wherein the seventh hexadecimal character is different from the first-sixth hexadecimal character; a eighth hexadecimal character to a Pauli-X gate and a Hadamard gate, wherein the eighth hexadecimal character is different from the first-seventh hexadecimal character; a ninth hexadecimal character to a Pauli-Z gate and a Hadamard gate, wherein the ninth hexadecimal character is different from the first-eighth hexadecimal character; a tenth hexadecimal character to a S gate and a Hadamard gate, wherein the tenth hexadecimal character is different from the first-ninth hexadecimal character; a eleventh hexadecimal character to a S gate, wherein the eleventh hexadecimal character is different from the first-tenth hexadecimal character; a twelfth hexadecimal character to a complex conjugate of an S gate, wherein the twelfth hexadecimal character is different from the first-eleventh hexadecimal character; a thirteenth hexadecimal character to a Pauli-X gate, an S gate, and a Hadamard gate, wherein the thirteenth hexadecimal character is different from the first-twelfth hexadecimal character; a fourteenth hexadecimal character to a Pauli-Y gate, an S gate, and a Hadamard gate, wherein the fourteenth hexadecimal character is different from the first-thirteenth hexadecimal character; a fifteenth hexadecimal character to a Pauli-Z gate, an S gate, and a Hadamard gate, wherein the fifteenth hexadecimal character is different from the first-fourteenth hexadecimal character; and a sixteenth hexadecimal character to a S gate, a Hadamard gate, and a Pauli-X gate wherein the sixteenth hexadecimal character is different from the first-fifteenth hexadecimal character.

In some implementations the quantum computation translation operation maps: a first hexadecimal character to a single qubit identity operation; a second hexadecimal character to a Pauli-X gate, wherein the second hexadecimal character is different from the first hexadecimal character; a third hexadecimal character to a Hadamard gate, wherein the third hexadecimal character is different from the first and second hexadecimal character; a fourth hexadecimal character to a Hadamard gate and a Pauli-X gate, wherein the fourth hexadecimal character is different from the first-third hexadecimal character; a fifth hexadecimal character to a Hadamard gate and a S gate, wherein the fifth hexadecimal character is different from the first-fourth hexadecimal character; a sixth hexadecimal character to a Hadamard gate and a complex conjugate of an S gate, wherein the sixth hexadecimal character is different from the first-fifth hexadecimal character; a seventh hexadecimal character to a Pauli-Y gate and a Hadamard gate, wherein the seventh hexadecimal character is different from the first-sixth hexadecimal character; a eighth hexadecimal character to a Pauli-X gate and a Hadamard gate, wherein the eighth hexadecimal character is different from the first-seventh hexadecimal character; a ninth hexadecimal character to a Pauli-Z gate and a Hadamard gate, wherein the ninth hexadecimal character is different from the first-eighth hexadecimal character; a tenth hexadecimal character to a S gate and a Hadamard gate, wherein the tenth hexadecimal character is different from the first-ninth hexadecimal character; a eleventh hexadecimal character to a S gate, wherein the eleventh hexadecimal character is different from the first-tenth hexadecimal character; a twelfth hexadecimal character to a complex conjugate of an S gate, wherein the twelfth hexadecimal character is different from the first-eleventh hexadecimal character; a thirteenth hexadecimal character to a Pauli-X gate, a complex conjugate of an S gate, and a Hadamard gate, wherein the thirteenth hexadecimal character is different from the first-twelfth hexadecimal character; a fourteenth hexadecimal character to a Pauli-Y gate, a complex conjugate of an S gate, and a Hadamard gate, wherein the fourteenth hexadecimal character is different from the first-thirteenth hexadecimal character; a fifteenth hexadecimal character to a Pauli-Z gate, a complex conjugate of an S gate, and a Hadamard gate, wherein the fifteenth hexadecimal character is different from the first-fourteenth hexadecimal character; and a sixteenth hexadecimal character to a complex conjugate of an S gate, a Hadamard gate, and a Pauli-X gate wherein the sixteenth hexadecimal character is different from the first-fifteenth hexadecimal character.

In some implementations the one or more hexadecimal data inputs comprise outputs of a cryptographic hash function applied to a user identifier.

In some implementations the method further comprises providing the respective representations of the one or more hexadecimal data inputs for use in an authentication protocol.

In some implementations the one or more hexadecimal data inputs comprise a first data input received from a first party accessor and a second data input received from a second party access target, and wherein the method further comprises: generating i) a first encryption key using a sequence of measurement results corresponding to the first data input, ii) a second encryption key using a sequence of measurement results corresponding to the second data input, and iii) an encrypted authorization token using the second encryption key; and sending i) the first encryption key to the first party accessor, and ii) the encrypted authorization token to the second party access target.

In some implementations the one or more hexadecimal data inputs comprise a first data input received from a first party accessor and a second data input received from a second party access target, and wherein the method further comprises: comparing the corresponding sequences of measurement results to determine whether the corresponding sequences sufficiently match, wherein two sequences of measurement results sufficiently match if a number of matching individual measurement results exceed a predetermined threshold; and in response to determining that the corresponding sequences sufficiently match, providing an output indicating that the corresponding sequences match; or in response to determining that the corresponding sequences do not sufficiently match, providing an output indicating that the corresponding sequences do not match.

In some implementations the one or more hexadecimal data inputs comprise a first data input received from a first party accessor and a second data input received from a second party access target, and wherein implementing a first and second sequence of quantum computations using quantum computing hardware to obtain a corresponding first and second sequence of measurement results comprises, for an n-th quantum computation in the first sequence of quantum computations: initializing a qubit included in the quantum computing hardware in a zero state; initializing a third qubit and a fourth qubit in a zero state; entangling the third qubit and the fourth qubit; applying a first swap quantum gate to the first qubit and the third qubit; applying a second swap quantum gate to the second qubit and the fourth qubit; applying the n-th quantum computation in the first sequence of quantum computations on the first qubit and measuring the first qubit to obtain a respective n-th measurement result in the first sequence of measurement results; and applying the n-th quantum computation in the second sequence of quantum computations on the second qubit and measuring the second qubit to obtain a respective n-th measurement result in the second sequence of measurement results.

In some implementations entangling the third qubit and the fourth qubit comprises applying a Hadamard gate to the third qubit and a CNOT operation to the third qubit and the fourth qubit, wherein the third qubit acts as a control for the CNOT operation.

The subject matter described in this specification can be implemented in particular ways so as to realize one or more of the following advantages.

The presently described quantum computation translation operation maps hexadecimal characters to respective sequences of quantum computations. The translation operation is therefore particularly useful and widely applicable because many computers store data in hexadecimal encodings and cryptographic hashes typically generate hexadecimal outputs. In addition, hashes are quantum attack resistant—so being able to use hexadecimal as our input is advantageous in the post-quantum era for quantum computation.

In addition, the presently described quantum computation translation operation produces corresponding sequences of quantum computations whose implementations have a low error rate. For example, by constructing the translation operation such that each sequence of quantum computations to which a hexadecimal character is mapped includes at most three gates or less, the required circuit depth is reduced and implementations of the circuit is therefore less likely to introduce errors to the qubits. As another example, the sequences of quantum computations are designed to have passive error correction through composite gates, i.e., the gate sequences do not include XXX or YYY or ZZZ or SSS. Composite gate sequences help to correct for systemic errors, such as calibration errors in the quantum hardware that may over or under rotate the qubit during a pi pulse. In addition composite gates help to dampen rotational echo. As another example, the sequences of gates are semi-orthogonal to each other so that they can be randomized, shifted or ordered in specific manner agreed upon between the parties wanting to authenticate in order to add an additional layer of security to the quantum computation process.

In addition, the presently described quantum computation translation operation is constructed to produce corresponding sequences of quantum computations that include single qubit gates that are universal, elementary, and/or in the Clifford-group. Expensive T gates are not required. Implementations of the produced sequences of quantum computations are therefore computationally stable, efficient and quantum hardware agnostic, e.g., more computationally stable and efficient than sequences quantum computations that use multi-qubit gates and/or non-universal gates and/or gates that are not in the Clifford group.

In addition, the presently described quantum computation translation operation can be incorporated in authentication and authorization processes to increase the security of such processes. For example, authentication and authorization processes implementing the presently described techniques can be more effective at preventing quantum or classical attacks, e.g., cryptanalysis, from malicious parties. This may be particularly beneficial in a post-quantum era where other conventional techniques, e.g., password-less multifactor authentication techniques that use strong encryption, may no longer be secure. Furthermore, the advantages of quantum security can be achieved without requiring qubit transmission or a functional, scalable quantum internet.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows an example truth table of measurement results for implementations of an example quantum computation translation.

Like reference numbers and designations in the various drawings indicate like elements.

DETAILED DESCRIPTION

This specification describes methods and systems for generating quantum representations of hexadecimal data inputs using a quantum computation translation operation that maps hexadecimal characters to respective sequences of quantum gates.

Figure 1:
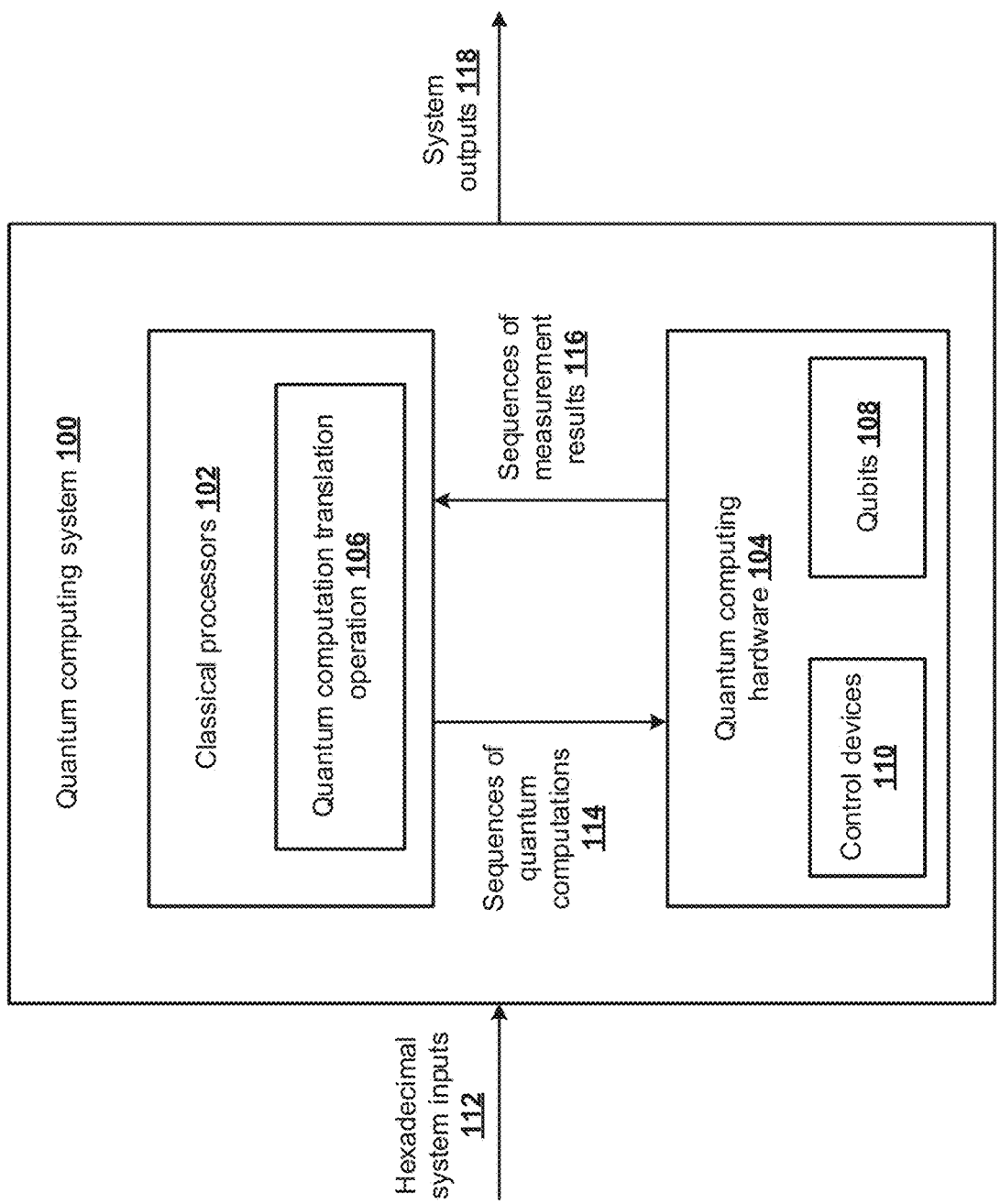
FIG. 1 shows an example quantum computing system.

FIG. 1 is a block diagram of an example quantum computing system 100. The system 100 is an example of a system implemented as computer programs on one or more classical and quantum computing devices in one or more locations, in which the systems, components, and techniques described below can be implemented. In some implementations the quantum computing system 100 may be a cloud-based quantum computing service.

The example system 100 includes one or more classical processors 102 for performing classical computations and quantum computing hardware 104 for performing quantum computations. For convenience, the classical processors 102 and quantum computing hardware 104 are illustrated as separate entities. However, in some implementations one or more classical processors can be included in quantum computing hardware 104, e.g., the quantum computing hardware 104 can include one or more components for performing classical computing operations.

The classical processors 102 are configured to apply a quantum computation translation operation 106 on received or otherwise obtained hexadecimal data inputs, e.g., system inputs 112. The quantum computation translation operation 106 is an operation that maps each hexadecimal character, e.g., 0-9 and A-F, to a respective quantum computation (or sequence of quantum computations) from a set of multiple quantum computations. Therefore, application of the quantum computation translation operation 106 on a received hexadecimal data input 112 produces a respective sequence of quantum computations, e.g., sequence of quantum computations 114. Properties of the quantum computation translation operation 106 and example quantum computation translation operations are described in more detail below with reference to FIGS. 3-5.

The classical processors 102 are configured to provide the quantum computing hardware 104 with data representing sequences of quantum computations produced by the quantum computation translation operation 106, e.g., sequence of quantum computations 114. The quantum computing hardware 104 is configured to perform the sequences of quantum computations.

The quantum computing hardware 104 includes components for performing the sequences of quantum computations, e.g., sequences of quantum gates, using quantum circuits. For example, the quantum computing hardware 104 includes multiple qubits 108 that are used to perform algorithmic operations or quantum computations and control devices 110 that operate the multiple qubits 108.

The specific physical realization of the qubits 108 and how they interact with one another is dependent on a variety of factors including the type of quantum computations that the quantum computing hardware 104 is performing. For example, the qubits may be realized via atomic, molecular or solid-state quantum systems. In other examples the qubits may include, but are not limited to, superconducting qubits or semi-conducting qubits.

The qubits 108 can be frequency tunable. For example, each qubit may have associated operating frequencies that can be adjusted, e.g., using one or more of the control devices 110, through application of voltage pulses via one or more drivelines coupled to the qubit. Example operating frequencies include qubit idling frequencies, qubit interaction frequencies, and qubit readout frequencies.

Different frequencies correspond to different operations that the qubit can perform. For example, setting the operating frequency to a corresponding idling frequency may put the qubit into a state where it does not strongly interact with other qubits, and where it may be used to perform single-qubit gates, e.g., Pauli-X, Pauli-Y, Pauli-Z, Hadamard and S gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates, e.g., CNOT gates or swap gates.

The control devices 110 can further include measurement devices, e.g., readout resonators. Measurement results obtained via measurement devices may be provided to one or more of the classical processors 102 for processing and analyzing. That is, the classical processors 102 can be configured to perform overhead classical operations associated with quantum computations.

The quantum computing hardware 104 performs received sequences of quantum computations, e.g., sequence 114, and provides as output data representing corresponding sequences of measurement results, e.g., sequence of measurement results 116. The sequence of measurement results will have a length equal to the length of the hexadecimal data input to which it corresponds to, and will include 0s and 1s.

The classical processors 102 are configured to process received sequences of measurement results, e.g., sequence 116, and generate corresponding system outputs, e.g., system outputs 118. For example, the classical processors 102 may be configured to directly output a sequence of measurement results received from the quantum computing hardware 104. Alternatively or in addition, the classical processors 102 may be configured to process one or more sequences of measurement results and provide as output an indication as to whether the received sequences of measurement results satisfy one or more properties. Alternatively or in addition, the classical processors 102 may be configured to generate encryption keys and authentication tokens based on received hexadecimal data inputs and corresponding sequences of measurement results, e.g., using a key generator or measured qubits as an XOR Cipher against an original hexadecimal input.

For example, in some implementations the system 100 may participate in an authentication process. In these implementations the system 100 may be a third party quantum computing system that participates in an authentication process between a first party accessor and a second party access target. The system 100 can be configured to receive a first hexadecimal data input, e.g., a cryptographic hash function of a user identifier, from the first party and a second hexadecimal data input, e.g., a cryptographic hash function of an expected user identifier, from the second party. The system 100 can then process the received hexadecimal inputs using the quantum computation translation 106 to obtain respective sequences of quantum computations. The quantum computing hardware 104 can implement the sequences of quantum computations to generate respective sequences of measurement results. In some implementations implementing sequences of quantum computations corresponding to a hexadecimal data input received from a first party accessor and a second party access target can include, for an n-th first computation and an n-th second computation in the sequences of quantum computations, entangling a pair of qubits and performing the first computation on one of the entangled qubits and the second computation on the other entangled qubit. Alternatively, the states of the entangled qubits can be swapped to an additional third and fourth qubit, and the first computation and second computation can be performed on the third and fourth qubit, as illustrated in example quantum circuit 200 of FIG. 2. The classical processors 102 can generate a first encryption key using a first sequence of measurement results corresponding to the hexadecimal input received from the first party, a second encryption key using a second sequence of measurement results corresponding to the hexadecimal input received from the second party, and an encrypted authorization token using the second encryption key. The system 100 can then provide the first encryption key to the first party as a first system output and the authentication token to the second party as a second system output. In response to receiving the first encryption key, the first party can provide the first encryption key to the second party. The second party can determine whether or not to allow the first party to access the requested data by determining whether the first encryption key can successfully decrypt the encrypted authorization token.

In other implementations a first copy of the system 100 may be included at the first party accessor and a second copy of the system 100 may be included at the second party access target. In these implementations, the first copy of the system may be used to generate a first sequence of measurement results corresponding to a first hexadecimal data input, e.g., a cryptographic hash function of a user identifier, and the second copy of the system may be used to generate a second sequence of measurement results corresponding to a second hexadecimal data input, e.g., a cryptographic hash function of an expected user identifier. The first party can send the first sequence of measurement results to the second party, and the second party can determine whether to authorize the first party or not using the received first sequence of measurement results and their locally computed second sequence of measurement results. For example, the second party can compare the first and second sequence of measurement results to determine whether the sequences sufficiently match, e.g., whether a number of matching individual measurement results exceed a predetermined threshold or not. In response to determining that the corresponding sequences sufficiently match, the second party can authorize access to the first party. In response to determining that the corresponding sequences do not sufficiently match, the second party can deny access to the first party. This setting can be particularly beneficial in cases where either party does not want to transmit the hash functions of the user identifier, e.g., to avoid cryptanalysis. Instead, binary strings corresponding to measurement results are transmitted, which, by construction, introduce probabilistic error and are not susceptible to cryptanalysis, as described in more detail below with reference to FIG. 4.

The above described applications of the system 100 to authentication processes are examples only. The system 100 could be applied to other types or variations of authentication processes. For example, the system 100 could be applied to any process where two parties generate a same symmetric key independently of each other. As another example, the system 100 could be applied in settings where two parties are required to prove to each other they have the same data without revealing the data to each other. As another example, existing protocols could use the system 100 and methods described in this specification by substituting their key-exchange/generation process with the system 100 and/or example process 500 of FIG. 5. Example authentication processes to which the system 100 could be applied to include HMAC: Keyed-Hashing for Message Authentication, Kerberos Network Authentication, OCB Authenticationed-Encryption Algorithms, OCRA: OATH Challenge-Response Algorithms, PICNIC, Secure Pre-Shared Key (PSK) Authentication for the Internet Key Exchange Protocol (IKE), or Advanced Encryption Standard (AES) Ciphersuites for Transport Layer Security (TLS). The system 100 could also equally be applied to any setting where alternative representations of hexadecimal data inputs are beneficial.

Figure 2:
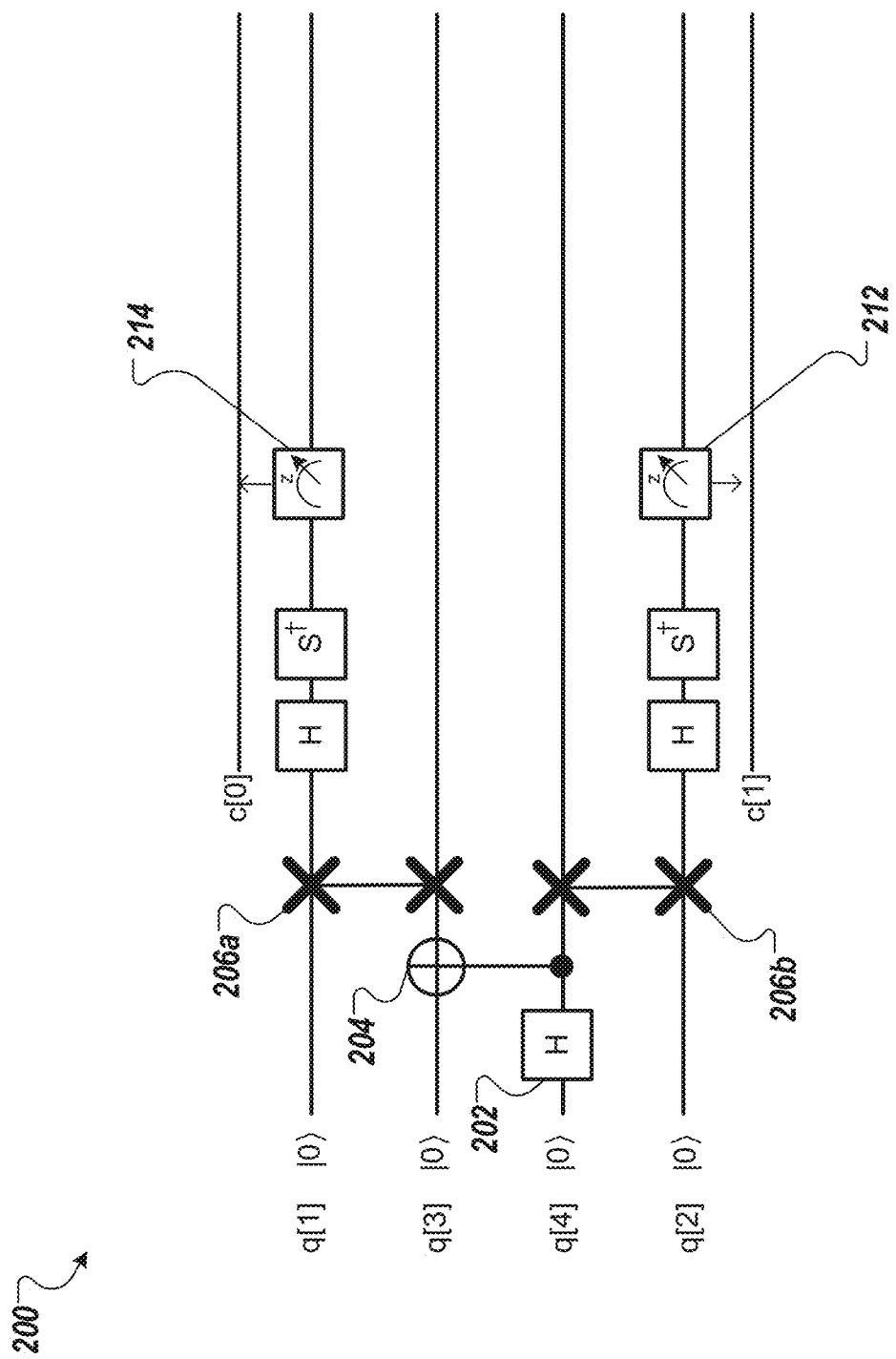
FIG. 2 shows an example quantum circuit for implementing a first quantum computation translation and a second quantum computation translation.

FIG. 2 shows an example quantum circuit 200 for implementing a first quantum computation translation and a second quantum computation translation. For example, the example quantum circuit 200 or variations thereof could be repeatedly used to implement the sequence of quantum computations described below with reference to step 506 of FIG. 5.

The example quantum circuit 200 operates on a register of four qubits q[1]-q[4], where each of the four qubits are prepared in a zero state |0>. The four qubits can be positioned on a single piece of quantum hardware, e.g., in quantum computing hardware 104 of FIG. 1, and can be controlled using control devices included in the quantum computing hardware.

Optionally, an initialization process is performed. The third qubit q[3] and fourth qubit q[4] can be entangled to create a bell-state pair. In particular, a Hadamard gate 202 can be applied to the fourth qubit q[4] and a CNOT operation 204 can be applied to the third and fourth qubits q[3] and q[4], with the fourth qubit q[4] acting as the control. The quantum gates 202 and 204 create the bell-state pair.

The entangled states of the third qubit q[3] and the fourth qubit q[4] can then be swapped to the first qubit q[1] and the second qubit q[2], respectively. In particular, a swap gate 206a can be applied to the first qubit q[1] and to the third qubit q[3] to swap the states of the first qubit q[1] and third qubit q[3], and a swap gate 206b can be applied to the second qubit q[2] and to the fourth qubit q[4] to swap the states of the second qubit q[2] and fourth qubit q[4]. Gates 202, 204, 206a and 206b are part of an initialization of the qubits prior to application of the quantum gates that are a result of the first party accessor's response and the second party access target's expected response, respectively.

The first quantum computation is performed on the first qubit q[1]. In example quantum circuit 200 the first quantum computation includes application of a Hadamard gate followed by the complex conjugate of an S gate. For example, under the example quantum computation translation operation described below with reference to FIG. 3, the first quantum computation may correspond to the hexadecimal character "5". After the first quantum computation has been performed on the first qubit q[1], a measurement operation 214 is applied and the outcome of the measurement operation 214 is transferred to classical hardware, e.g., via classical bit c[0].

The second quantum computation is performed on the first qubit q[2]. In example quantum circuit 200 the second quantum computation also includes application of a Hadamard gate followed by the complex conjugate of an S gate. This indicates that the hexadecimal inputs used by the quantum computation translation operation to generate the first quantum computation and the second quantum computation are the same. After the second quantum computation has been performed on the second qubit q[2], a measurement operation 312 is applied and the outcome of the measurement operation 312 is transferred to classical hardware in the second segmented quantum computing environment, e.g., via classical bit c[1].

Figure 3:
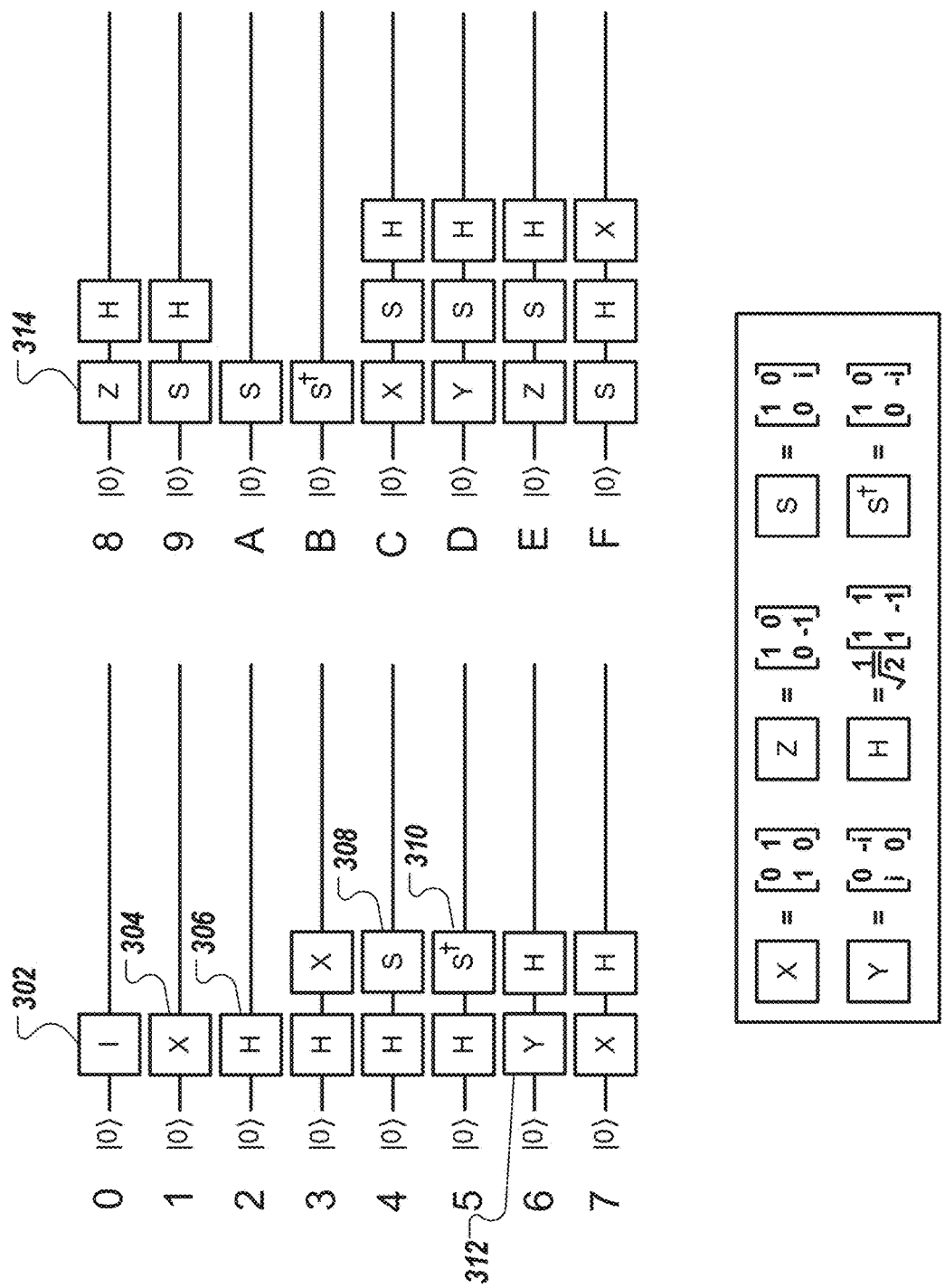
FIG. 3 illustrates an example hexadecimal to quantum computation translation operation.

FIG. 3 illustrates an example quantum computation translation operation that maps hexadecimal characters to respective quantum computations.

The example quantum computation translation operation illustrated in FIG. 3 maps hexadecimal characters 0-9 and A-F to respective sequences of single qubit quantum gates that can be applied to a qubit prepared in an initial state, e.g., a zero state.

For example, the hexadecimal character 0 is mapped to a single qubit identity operation 302. The hexadecimal character 1 is mapped to a Pauli-X gate 304. The hexadecimal character 2 is mapped to a Hadamard gate 306. The hexadecimal character 3 is mapped to a sequence of two single qubit gates—a Hadamard gate followed by a Pauli-X gate. The hexadecimal character 4 is mapped to a sequence of two single qubit gates—a Hadamard gate followed by a S gate. The hexadecimal character 5 is mapped to a sequence of two single qubit gates—a Hadamard gate followed by a complex conjugate of an S gate. The hexadecimal character 6 is mapped to a sequence of two single qubit gates—a Pauli-Y gate followed by a Hadamard gate. The hexadecimal character 7 is mapped to a sequence of two single qubit gates—a Pauli-X gate followed by a Hadamard gate. The hexadecimal character 8 is mapped to a sequence of two single qubit gates—a Pauli-Z gate followed by a Hadamard gate. The hexadecimal character 9 is mapped to a sequence of two single qubit gates—an S gate followed by a Hadamard gate.

The hexadecimal character A is mapped to an S gate. The hexadecimal character B is mapped to a complex conjugate of an S gate. The hexadecimal character C is mapped to a sequence of three single qubit gates—a Pauli-X gate, followed by an S gate, followed by a Hadamard gate. The hexadecimal character D is mapped to a sequence of three single qubit gates—a Pauli-Y gate, followed by an S gate, followed by a Hadamard gate. The hexadecimal character E is mapped to a sequence of three single qubit gates—a Pauli-Z gate, followed by an S gate, followed by a Hadamard gate. The hexadecimal character F is mapped to a sequence of three single qubit gates—an S gate, followed by a Hadamard gate, followed by a Pauli-X gate.

The particular mapping of the hexadecimal characters 0-9 and A-F illustrated in FIG. 3 is one of many possible examples. For example, the hexadecimal characters could be mapped to different sequences of single qubit quantum gates, i.e., an arbitrary first hexadecimal character could be mapped to the single qubit identity operation 302, an arbitrary second hexadecimal character could be mapped to the Pauli-X gate 304, etc. In other words, the quantum computation translation operation can be any bijection between the hexadecimal characters 0-9 and A-F and the illustrated sequences of single qubit quantum gates.

FIG. 4 shows an example truth table 400 representing an output density matrix of multiple outputs of implementations of the quantum computation translation operation described in FIG. 3.

Each entry in the example truth table 400 corresponds to measured results of first implementations of a respective quantum gate combination on a first qubit (performed by "Alice") and measured results of second implementations of a respective quantum gate combination on a second qubit (performed by "Bob"). For example, entry 402 corresponds to measured results of implementations of a quantum gate sequence SHX (i.e., the sequence of quantum gates to which the quantum computation translation operation maps the hexadecimal character "F" to) on a first qubit, and measured results of implementations of a quantum gate X (i.e., the quantum gate to which the quantum computation translation operation maps the hexadecimal character "1" to) on a second qubit. As another example, entry 404 corresponds to measured results of implementations of a quantum gate S (i.e., the sequence of quantum gates to which the quantum computation translation operation maps the hexadecimal character "A" to) on a first qubit, and measured results of implementations of a quantum gate S on a second qubit.

Each entry of the example truth table 400 can take different values representing a relationship between the measured results of the first implementations of the respective quantum gate combination on the first qubit and the measured results of the second implementations of the respective quantum gate combination on the second qubit.

For example, if the measured results of the first implementations and second implementations are the same, the respective entry in the truth table is a "T" which indicates that the multiple outputs matched 100% of the time. Entries with a "T*" indicate that the multiple outputs matched 100% of the time when the complex conjugate of an S gate was implemented (instead of a standard S gate). Such adjustments to a quantum computation translation operation can be determined prior to application of the translation operation at runtime, e.g., prior to implementing the translation operation in an authentication process. For example, in some cases the translation operation can be tested using specific available hardware and refined to improve the consistency of the translation operation outcomes.

Conversely, if the measured results of the first implementations and second implementations are never the same, the respective entry in the truth table is a "F" which indicates that the multiple outputs matched 0% of the time.

If the measured results of the first implementations and second implementations are the same with probability ½ and differ with probability ½, the respective entry in the truth table is a "%" which indicates that the multiple outputs matched 50% of the time.

Entries in the truth table with "!" represent unintended matches, i.e., cases where the multiple outputs unintentionally matched 100% of the time.

The example truth table 400 is not mutually orthogonal—the table does not show a pattern of "T" values on the diagonals and elsewhere "F" values. This provides an additional layer of security for applications of the hexadecimal-quantum computation translation, e.g., applications to authentication protocols. For example, if the example quantum computation translation operation had been designed to produce an orthogonal truth table, a threat actor with prior knowledge that their provided hexadecimal data input is incorrect could flip corresponding measurement results in a sequence of generated measurement results, i.e., flip measured qubit states 0 to a 1 or measured qubit states 1 to a 0. However, the specific construction of the quantum computation translation operations described in this specification introduce probabilistic error which prevents such malicious cryptanalysis.

Figure 5:
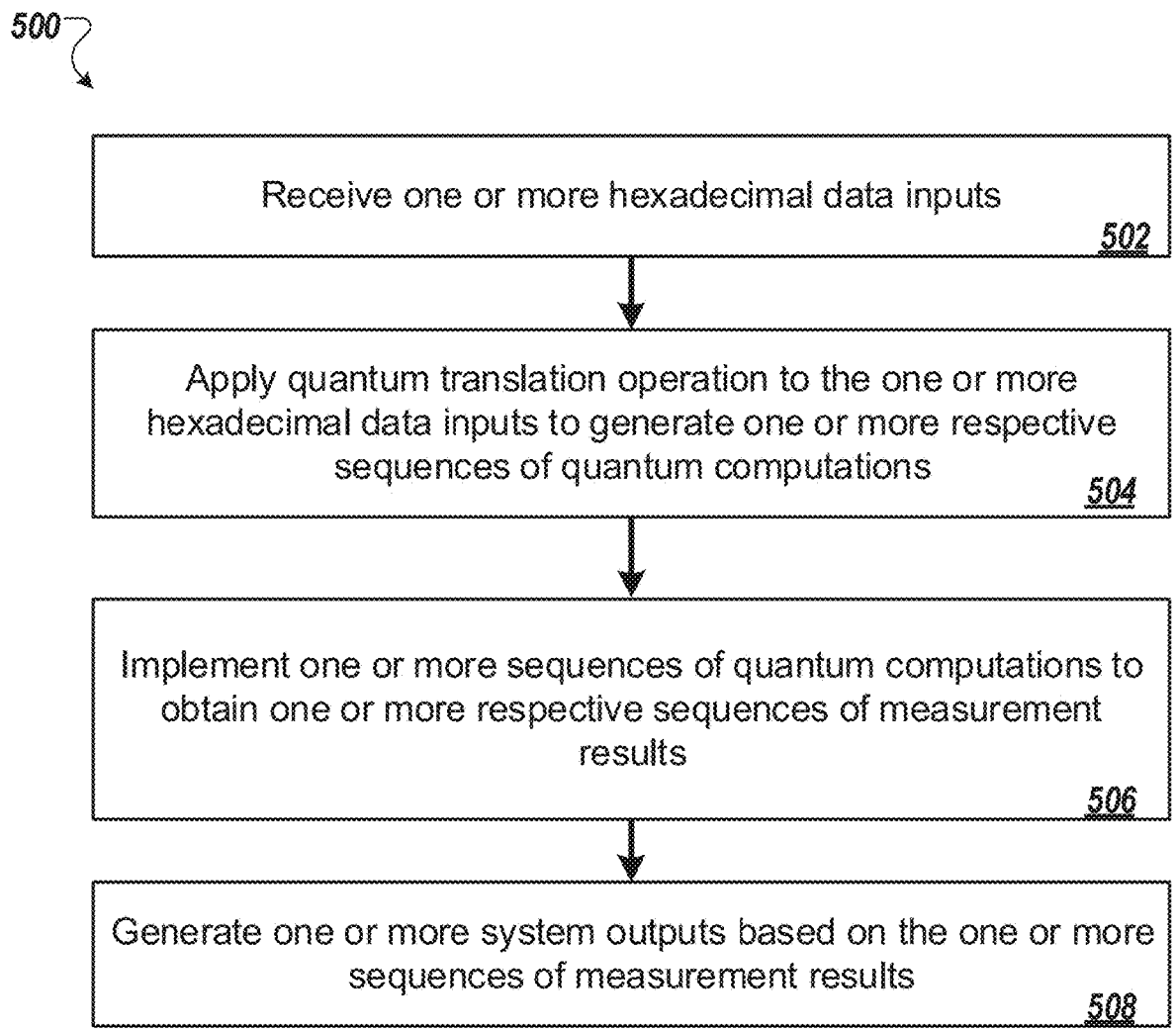
FIG. 5 is a flow diagram of an example process for generating a quantum representation of a hexadecimal data input.

FIG. 5 is a flowchart of an example process 500 for generating a quantum representation of a hexadecimal data input. For convenience, the process 500 will be described as being performed by a system of one or more classical and quantum computing devices located in one or more locations. For example, example system 100 of FIG. 1, appropriately programmed in accordance with this specification, can perform the process 500.

The system obtains one or more hexadecimal data inputs (step 502). In some implementations, the one or more hexadecimal data inputs may include one or more outputs of a cryptographic hash function, e.g., applied to a user identifier. For example, the system may obtain a first hexadecimal data input from a first party accessor and a second hexadecimal data input from a second party access target. In these examples the first hexadecimal data input may be a response generated by the first party to an authentication challenge set by the second party. For example, the first party may have requested access to data stored by the second party. In response to the first party requesting access to the data, the second party can send the first party an authentication challenge that was previously established between the first party and the second party during a prior enrollment process. The second hexadecimal data input may be a response generated by the second party to the authentication challenge, e.g., a response that the second party expects the first party to generate in response to receiving the authentication challenge. In a secure environment, e.g., absent eavesdroppers or malicious parties, and assuming the first party and second party generate error-free responses to the authentication challenge, the first plaintext data input and the second plaintext data input will be the same.

The system applies a quantum computation translation operation to each obtained hexadecimal data input to generate one or more corresponding sequences of quantum computations (step 504). The quantum computation translation operation is an operation that maps hexadecimal characters to respective quantum computations. For example, the quantum computation translation operation can map each hexadecimal character 0-9, A-F appearing in a hexadecimal data input to a corresponding quantum computation from a set of multiple quantum computations.

In some implementations each quantum computation in the set of multiple quantum computations comprises a sequence of at most three single-qubit quantum gates. For example, the example quantum computation translation operation shown in FIG. 3 maps hexadecimal characters to a corresponding quantum computation from a set of multiple quantum computations that includes five quantum computations that include one respective single-qubit quantum gate, seven quantum computations that include two respective single-qubit quantum gates, and four quantum computations that include three respective single-qubit quantum gates.

In some implementations, the set of multiple quantum computations can include quantum gates taken from a universal gate set and/or quantum gates in the Clifford group, e.g., Pauli-X gates, Pauli-Y gates, Pauli-Z gates, S gates, Hadamard gates, or complex conjugates thereof. The particular quantum gates included in the set of multiple quantum computations can depend on the text encoding used to generate the first plaintext data input and the second plaintext data, e.g., the size of the alphabet of characters used in the text encoding, performance requirements, and/or properties of the quantum hardware used to implement the quantum computations, e.g., the number of available qubits, qubit error rates, or quantum hardware fidelity. An example quantum computation translation operation is described above with reference to FIG. 3.

The system implements the one or more sequences of quantum computations using quantum computing hardware to obtain one or more corresponding sequences of measurement results (step 506). To implement a sequence of quantum computations, the system sequentially, for each n=1, . . . , N, implements a quantum computation corresponding to the n-th character in the corresponding hexadecimal data input to obtain an n-th measurement result in the corresponding sequence of measurement results, where N represents the length of the hexadecimal data input.

In some implementations, e.g., those where the example process 500 is applied to an authentication process, the system may implement multiple sequences of quantum computations corresponding to multiple received hexadecimal data inputs in parallel. For example, as described above with reference to FIG. 1, in some implementations the system may receive a first data input received from a first party accessor and a second data input received from a second party access target at step 502. In these implementations the system can apply the quantum computation translation operation to the first hexadecimal data input to generate a first sequence of quantum computations and to the second hexadecimal data input to generate a second sequence of quantum computations at step 504. The system can then implement the first and second sequence of quantum computations in parallel. An example process for implementing a quantum computation corresponding to the n-th character in the first hexadecimal data input in parallel to a quantum computation corresponding to the n-th character in the second hexadecimal data input to obtain an n-th measurement result in the first sequence of measurement results and an n-th measurement result in the second sequence of measurement results is now described.

The system prepares a first qubit, second, third, and fourth qubit in a zero state. The system entangles the third qubit and the fourth qubit. For example, the system can apply a Hadamard gate to the third qubit (or alternatively to the fourth qubit) and a CNOT operation to the third qubit and the fourth qubit, where the third qubit (or, if the Hadamard gate is applied to the fourth qubit, the fourth qubit) acts as a control for the CNOT operation. The system applies a first swap quantum gate to the first qubit and the third qubit, and applies a second swap quantum gate to the second qubit and the fourth qubit.

The system then applies the n-th quantum computation in the first sequence of quantum computations to the first qubit and a measurement operation to the first qubit to obtain an n-th measurement result in the first sequence of measurement results. The system also applies, approximately in parallel, the n-th quantum computation in the second sequence of quantum computations to the second qubit and a measurement operation to the second qubit to obtain an n-th measurement result in the second sequence of measurement results.

The system provides the one or more sequences of measurement results as respective representations of the one or more hexadecimal data inputs (step 508). In some implementations the system can directly provide the one or more sequences of measurement results as a system output, as described above with reference to FIG. 1. In other implementations, the system can perform additional operations on the respective representations of the one or more hexadecimal data inputs. For example, the system can compare representations of the one or more hexadecimal data inputs to determine whether they sufficiently match or not, e.g., as part of a user verification process. As another example, the system can generate one or more encryption keys and/or authentication tokens based on the respective representations of the one or more hexadecimal data inputs and/or the corresponding hexadecimal inputs, e.g., as part of an authentication process. Example additional operations that the system can perform are described above with reference to FIG. 1.

Figure 6:
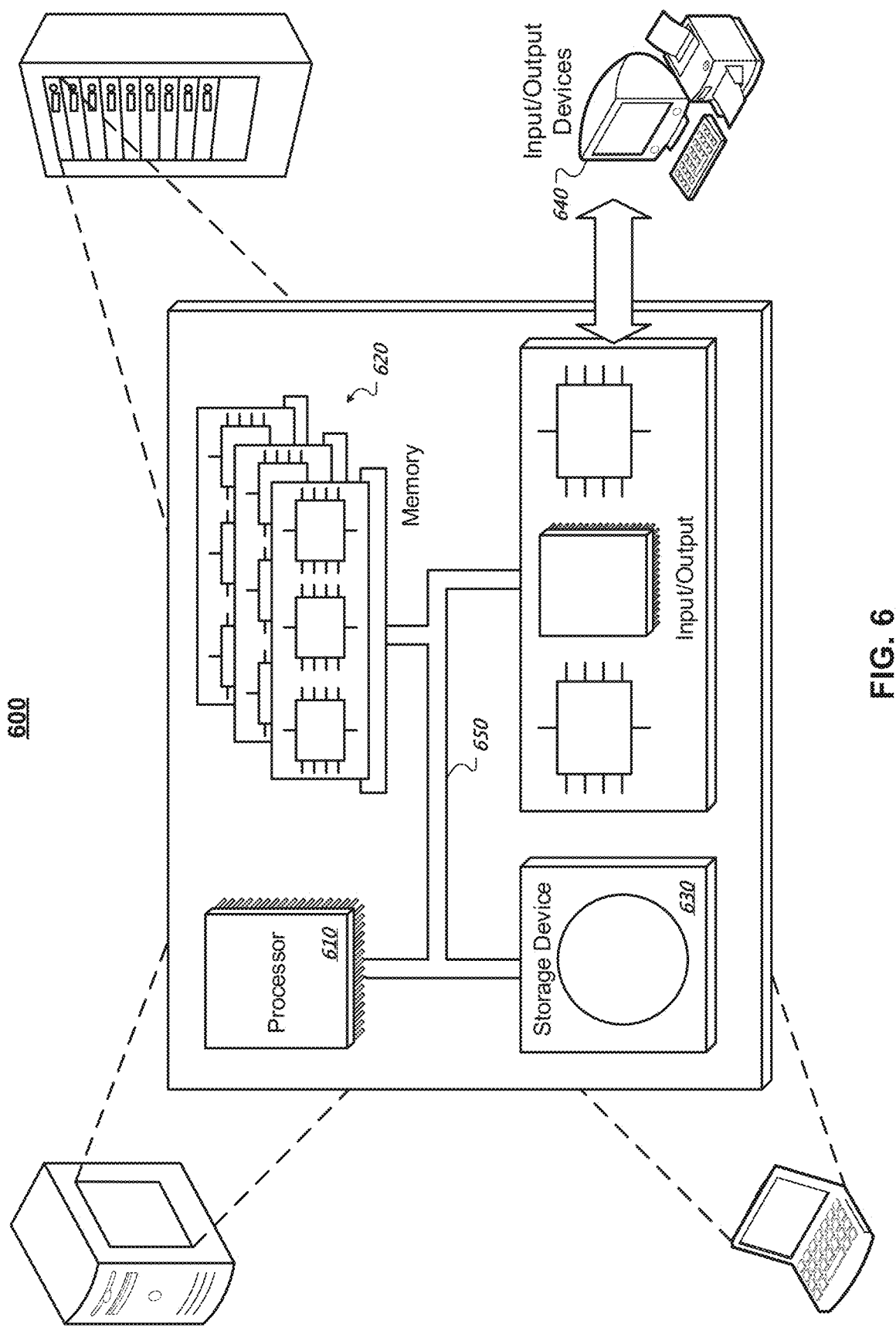
FIG. 6 depicts an example classical processor that may be used to carry out the classical computing methods described herein.

FIG. 6 illustrates a schematic diagram of an exemplary generic classical processing system 600. The system 600 can be used for the classical operations described in this specification according to some implementations. The system 600 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 600 includes a processor 610, a memory 620, a storage device 630, and an input/output device 640. Each of the components 610, 620, 630, and 620 are interconnected using a system bus 650. The processor 610 may be enabled for processing instructions for execution within the system 600. In one implementation, the processor 610 is a single-threaded processor. In another implementation, the processor 610 is a multi-threaded processor. The processor 610 may be enabled for processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 may be enabled for providing mass storage for the system 900. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method comprising:
receiving one or more hexadecimal data inputs;
applying a quantum computation translation operation to each hexadecimal data input to generate one or more corresponding sequences of quantum computations;
implementing the one or more sequences of quantum computations using quantum computing hardware to obtain one or more corresponding sequence of measurement results; and
providing the one or more sequences of measurement results as respective representations of the one or more hexadecimal data inputs.

2. The method of claim 1, wherein the quantum computation translation operation maps each hexadecimal character to a respective quantum computation from a set of multiple quantum computations.

3. The method of claim 2, wherein each quantum computation in the set of multiple quantum computations comprises a sequence of at most three single-qubit quantum gates.

4. The method of claim 2, wherein the set of multiple quantum computations comprises five quantum computations comprising one respective single-qubit quantum gate.

5. The method of claim 2, wherein the set of multiple quantum computations comprises seven quantum computations comprising two respective single-qubit quantum gates.

6. The method of claim 2, wherein the set of multiple quantum computations comprises four quantum computations comprising three respective single-qubit quantum gates.

7. The method of claim 2, wherein one or more quantum computation in the set of quantum computation comprises one or more single-qubit quantum gates from the Clifford group.

8. The method of claim 2, wherein one or more quantum computation in the set of quantum computation comprises one or more single-qubit quantum gates from a universal set of gates.

9. The method of claim 2 wherein each quantum computation in the set of multiple quantum computations comprises one or more single-qubit quantum gates from a set of single-qubit quantum gates, the set of single qubit gates comprising identity operations, Pauli-X gates, Pauli-Y gates, Pauli-Z gates, Hadamard gates, S gates and complex conjugates of the S gate.

10. The method of claim 1, wherein the quantum computation translation operation maps:
a first hexadecimal character to a single qubit identity operation;
a second hexadecimal character to a Pauli-X gate, wherein the second hexadecimal character is different from the first hexadecimal character;
a third hexadecimal character to a Hadamard gate, wherein the third hexadecimal character is different from the first and second hexadecimal character;
a fourth hexadecimal character to a Hadamard gate and a Pauli-X gate, wherein the fourth hexadecimal character is different from the first-third hexadecimal character;
a fifth hexadecimal character to a Hadamard gate and a S gate, wherein the fifth hexadecimal character is different from the first-fourth hexadecimal character;
a sixth hexadecimal character to a Hadamard gate and a complex conjugate of an S gate, wherein the sixth hexadecimal character is different from the first-fifth hexadecimal character;
a seventh hexadecimal character to a Pauli-Y gate and a Hadamard gate, wherein the seventh hexadecimal character is different from the first-sixth hexadecimal character;

a eighth hexadecimal character to a Pauli-X gate and a Hadamard gate, wherein the eighth hexadecimal character is different from the first-seventh hexadecimal character;

a ninth hexadecimal character to a Pauli-Z gate and a Hadamard gate, wherein the ninth hexadecimal character is different from the first-eighth hexadecimal character;

a tenth hexadecimal character to a S gate and a Hadamard gate, wherein the tenth hexadecimal character is different from the first-ninth hexadecimal character;

a eleventh hexadecimal character to a S gate, wherein the eleventh hexadecimal character is different from the first-tenth hexadecimal character;

a twelfth hexadecimal character to a complex conjugate of an S gate, wherein the twelfth hexadecimal character is different from the first-eleventh hexadecimal character;

a thirteenth hexadecimal character to a Pauli-X gate, an S gate, and a Hadamard gate, wherein the thirteenth hexadecimal character is different from the first-twelfth hexadecimal character;

a fourteenth hexadecimal character to a Pauli-Y gate, an S gate, and a Hadamard gate, wherein the fourteenth hexadecimal character is different from the first-thirteenth hexadecimal character;

a fifteenth hexadecimal character to a Pauli-Z gate, an S gate, and a Hadamard gate, wherein the fifteenth hexadecimal character is different from the first-fourteenth hexadecimal character; and a sixteenth hexadecimal character to a S gate, a Hadamard gate, and a Pauli-X gate wherein the sixteenth hexadecimal character is different from the first-fifteenth hexadecimal character.

11. The method of claim 1, wherein the quantum computation translation operation maps:

a first hexadecimal character to a single qubit identity operation;

a second hexadecimal character to a Pauli-X gate, wherein the second hexadecimal character is different from the first hexadecimal character;

a third hexadecimal character to a Hadamard gate, wherein the third hexadecimal character is different from the first and second hexadecimal character;

a fourth hexadecimal character to a Hadamard gate and a Pauli-X gate, wherein the fourth hexadecimal character is different from the first-third hexadecimal character;

a fifth hexadecimal character to a Hadamard gate and a S gate, wherein the fifth hexadecimal character is different from the first-fourth hexadecimal character;

a sixth hexadecimal character to a Hadamard gate and a complex conjugate of an S gate, wherein the sixth hexadecimal character is different from the first-fifth hexadecimal character;

a seventh hexadecimal character to a Pauli-Y gate and a Hadamard gate, wherein the seventh hexadecimal character is different from the first-sixth hexadecimal character;

a eighth hexadecimal character to a Pauli-X gate and a Hadamard gate, wherein the eighth hexadecimal character is different from the first-seventh hexadecimal character;

a ninth hexadecimal character to a Pauli-Z gate and a Hadamard gate, wherein the ninth hexadecimal character is different from the first-eighth hexadecimal character;

a tenth hexadecimal character to a S gate and a Hadamard gate, wherein the tenth hexadecimal character is different from the first-ninth hexadecimal character;

a eleventh hexadecimal character to a S gate, wherein the eleventh hexadecimal character is different from the first-tenth hexadecimal character;

a twelfth hexadecimal character to a complex conjugate of an S gate, wherein the twelfth hexadecimal character is different from the first-eleventh hexadecimal character;

a thirteenth hexadecimal character to a Pauli-X gate, a complex conjugate of an S gate, and a Hadamard gate, wherein the thirteenth hexadecimal character is different from the first-twelfth hexadecimal character;

a fourteenth hexadecimal character to a Pauli-Y gate, a complex conjugate of an S gate, and a Hadamard gate, wherein the fourteenth hexadecimal character is different from the first-thirteenth hexadecimal character;

a fifteenth hexadecimal character to a Pauli-Z gate, a complex conjugate of an S gate, and a Hadamard gate, wherein the fifteenth hexadecimal character is different from the first-fourteenth hexadecimal character; and a sixteenth hexadecimal character to a complex conjugate of an S gate, a Hadamard gate, and a Pauli-X gate wherein the sixteenth hexadecimal character is different from the first-fifteenth hexadecimal character.

12. The method of claim 1, wherein the one or more hexadecimal data inputs comprise outputs of a cryptographic hash function applied to a user identifier.

13. The method of claim 1, wherein the method further comprises providing the respective representations of the one or more hexadecimal data inputs for use in an authentication protocol.

14. The method of claim 13, wherein the one or more hexadecimal data inputs comprise a first data input received from a first party accessor and a second data input received from a second party access target, and wherein the method further comprises:

generating i) a first encryption key using a sequence of measurement results corresponding to the first data input, ii) a second encryption key using a sequence of measurement results corresponding to the second data input, and iii) an encrypted authorization token using the second encryption key; and sending i) the first encryption key to the first party accessor, and ii) the encrypted authorization token to the second party access target.

15. The method of claim 13, wherein the one or more hexadecimal data inputs comprise a first data input received from a first party accessor and a second data input received from a second party access target, and wherein the method further comprises:

comparing the corresponding sequences of measurement results to determine whether the corresponding sequences sufficiently match, wherein two sequences of measurement results sufficiently match if a number of matching individual measurement results exceed a predetermined threshold; and in response to determining that the corresponding sequences sufficiently match, providing an output indicating that the corresponding sequences match; or in response to determining that the corresponding sequences do not sufficiently match, providing an output indicating that the corresponding sequences do not match.

16. The method of claim 13, wherein the one or more hexadecimal data inputs comprise a first data input received from a first party accessor and a second data input received from a second party access target, and wherein implementing a first and second sequence of quantum computations using quantum computing hardware to obtain a corresponding first and second sequence of measurement results comprises, for an n-th quantum computation in the first sequence of quantum computations:
- initializing a qubit included in the quantum computing hardware in a zero state;
- initializing a third qubit and a fourth qubit in a zero state;
- entangling the third qubit and the fourth qubit;
- applying a first swap quantum gate to the first qubit and the third qubit;
- applying a second swap quantum gate to the second qubit and the fourth qubit;
- applying the n-th quantum computation in the first sequence of quantum computations on the first qubit and measuring the first qubit to obtain a respective n-th measurement result in the first sequence of measurement results; and
- applying the n-th quantum computation in the second sequence of quantum computations on the second qubit and measuring the second qubit to obtain a respective n-th measurement result in the second sequence of measurement results.

17. The method of claim 16, wherein entangling the third qubit and the fourth qubit comprises applying a Hadamard gate to the third qubit and a CNOT operation to the third qubit and the fourth qubit, wherein the third qubit acts as a control for the CNOT operation.

18. A system comprising:
one or more classical processors; and
quantum computing hardware;
wherein the system is configured to perform operations comprising:
- obtaining one or more hexadecimal data inputs;
- applying a quantum computation translation operation to each hexadecimal data input to generate one or more corresponding sequences of quantum computations;
- implementing the one or more sequences of quantum computations using quantum computing hardware to obtain one or more corresponding sequence of measurement results; and
- providing the one or more sequences of measurement results as respective representations of the one or more hexadecimal data inputs.

19. The system of claim 18, wherein the quantum computing hardware comprises components for performing sequences of quantum computations by applying quantum circuits to one or more qubits.

20. The system of claim 19, wherein the components for performing sequences of quantum computations comprise control devices configured to adjust qubit operating frequencies.

* * * * *